United States Patent [19]

Potash

[11] 4,435,756
[45] Mar. 6, 1984

[54] BRANCH PREDICTING COMPUTER

[75] Inventor: Hanan Potash, La Jolla, Calif.

[73] Assignee: Burroughs Corporation, Detroit, Mich.

[21] Appl. No.: 326,837

[22] Filed: Dec. 3, 1981

[51] Int. Cl.³ .............................................. G06F 9/42
[52] U.S. Cl. .............................................. 364/200
[58] Field of Search ................................... 364/200

[56] References Cited
U.S. PATENT DOCUMENTS 4,370,711  1/1983  Smith .............................. 364/200

*Primary Examiner*—Raulfe B. Zache
*Attorney, Agent, or Firm*—Charles J. Fassbender; Kevin R. Peterson

[57] ABSTRACT

Disclosed is a digital computer which includes means for storing a plurality of instructions arranged as a program with conditional branch instructions at respective locations in said program specifying conditions to be tested; an instruction prefetch means and an instruction execute means for respectively fetching and executing different instructions of said program at the same time in a pipelined fashion; said conditional branch instruction at each of said locations further having multiple encodings which predict the state of the condition to be tested; and a control means for detecting when said prefetch means has fetched one of said conditional branch instructions and for fetching the next instruction based on the predicted state of the condition to be tested and encoded in said fetched conditional branch instruction.

9 Claims, 9 Drawing Figures

BRANCH PREDICTING COMPUTER

BACKGROUND OF THE INVENTION

This invention relates to the architecture of a digital computer; and more particularly, it relates to the architecture of a digital computer which operates on several different instructions simultaneously in a pipelined fashion.

To better understand this invention, reference should be made to FIG. 1 wherein the basic modules of a pipelined digital computer are illustrated. That FIG. 1 computer includes an instruction prefetch module (labeled IPF), an execute module (labeled EX), and a memory module (labeled M). Further, the execute module includes an address module (labeled A), an operand module (labeled O), and a compute module (labeled C).

Modules IPF, A, O, and C simultaneously operate on different instructions of the program. All of the instructions in that program are stored in memory module M. Module IPF operates to fetch the instructions from memory module M; module A operates to form addresses of operands that are called for in the instructions; module O operates to fetch the operands that are address formed by module A; and module C operates to perform computations on the operands fetched by module O and to store the results back in memory module M.

After any one module performs its above-described function, it passes the results to the next module. That next module then performs its above-described functions and passes the new results to the next module. Thus, modules IPF, A, O, and C form a "pipeline" through which instructions pass; and buses 10, 11, and 12 provide a means by which the modules pass their results through the pipeline to the next module.

Buses 13, 14, 15, and 16 also are provided as a means by which modules IPF, A, O, and C respectively read and/or write various items of information into the memory module while performing their described functions. Module IPF, for example, utilizes bus 13 to fetch instructions from the memory; module A utilizes bus 14 to fetch index registers from the memory that are needed to form operand addresses; module O utilizes bus 15 to fetch operands from the memory at the addresses formed by module A; and module C utilizes bus 16 to store computed results back into the memory.

FIG. 2 shows in detail the sequence by which the FIG. 1 computer executes a program consisting of nine instructions I1 through I9. Those instructions are illustrated in FIG. 1 as being resident in memory M. Instructions I1 through I9 sequentially follow each other in the memory; and instruction I5 is a conditional branch instruction. It tests a condition and branches back to instruction I1 if the condition is true and branches to instruction I6 if that condition is false.

A typical format for a conditional branch instruction consists of an op code (OP) and a branch address (BA) as indicated by reference numeral 17. Op code OP is one pre-assigned combination of ones and zeroes which identifies the instruction as being a conditional branch and identifies the condition to be tested. For example, a binary coded decimal 22 in a Burroughs B4800 computer specifies a branch if equal; whereas a binary coded decimal 25 specifies a branch if not equal. BA is the address in the memory module M of the instruction that is to be executed next if the specified condition is true.

During cycle 1 of FIG. 2, module IPF fetches instruction I1. Thereafter, during cycle 2, module A forms the addresses of the operands needed by instruction I1; while module IPF simultaneously fetches instruction I2. This sequence of operation continues in a pipelined fashion as illustrated in FIG. 2 through cycle 5 at which time the conditional branch instruction I5 is fetched by module IPF.

After fetching the conditional branch instruction I5, module IPF needs to decide whether to fetch instruction I1 or instruction I6 as the next instruction. This would be no problem if the condition to be tested by instruction I5 were ready for testing immediately after that instruction was fetched by module IPF. But that condition can be changed by the preceding instruction I4, so the condition will not be available for testing until instruction I4 has been acted upon by the last module C in the pipeline. That occurs as illustrated in FIG. 2 at the end of cycle 7.

The actual condition itself may be just one bit or the result of a whole sequence of calculations. For example, the IBM 360 computers and IBM 370 computers contain a set of flip-flops called "condition codes", and each possible condition that the computer can test is stored in the condition code's flip-flops. One of the condition codes is "equals" and it is automatically set to a "1" or reset to a "0" right after the computer executes an arithmetic instruction.

In some prior art pipelined computers, module IPF always fetches the instruction at branch address BA following the fetch of a conditional branch instruction. This operation is illustrated in cycle 6 of FIG. 2 wherein instruction I1 is fetched by module IPF. Thereafter, in cycles 7 and 8, instructions I2 and I3 respectively are also fetched by module IPF. Then in cycle 8, module C determines whether or not the condition specified by instruction I5 was such that instructions I1, I2, and I3 should have been fetched by module IPF during cycles 6, 7, and 8.

If instruction I6 should have been fetched instead, that fact is signaled by module C over a control line 18 to modules IPF, A, and O. In response to that signal, module IPF fetches instructions I6, I7, and I8 respectively during cycles 9, 10, and 11; and modules A, O, and C forego any further operations on instructions I1, I2, and I3.

A problem, however, with this sequence of operation is that many cycles are wasted because they perform useless operations. In the above example, module IPF wastes cycles 6 through 8. Typically, a program contains thousands of conditional branch instructions; and so these wasted cycles significantly reduce the computer's throughput.

One way to decrease the number of these wasted cycles is to add a condition predictor flip-flop for each condition that the computer can test. For example, one condition predictor flip-flop could be added for the "equals" condition that is tested by a branch-if-equal instruction; and that flip-flop would indicate a predicted state of true or false for the "equals" condition based on the actual state of that condition over the last several times it was tested. Then when a conditional branch instruction is encountered by module IPF, the next instruction would be fetched based on the predicted state of the condition being tested as stored in the condition predictor flip-flops.

But this mechanism still wastes too many cycles. And why this is so can be seen by inspection of FIG. 3. There a program is illustrated consisting of instructions I10 through I23; and instructions I14 and I16 are conditional branch instructions.

Suppose now that the branch from instruction I14 to instruction I20 is taken very infrequently; whereas the branch from instruction I16 to instruction I10 is taken very frequently. This is a very practical possibility as instruction I13 could be making a comparison for an exception condition that instruction I14 tests, and instruction I15 could be setting or resetting the "equals" condition to indicate whether or not instruction loop I10-I16 should be repeated.

Thus, to minimize wasted cycles in the FIG. 3 program due to conditional branch instruction I16, the predicted "equals" condition should be true. But at the same time, to minimize wasted cycles due to conditional branch instruction I14, the predicted equals condition should be false. Thus a dilemma exists in which one predicted state of a condition minimizes wasted cycles caused by conditional branch instructions at some locations in a program while maximizing wasted cycles caused by conditional branch instructions at other locations in the program.

This dilemma might seemingly be avoided by choosing one state for the condition predictor flip-flops, and then rearranging the program such that the one predicted state always is a correct prediction. Suppose, for example, that the condition predictor flip-flops indicate the "equals" condition will be false and the "not equals" condition will be true. Then suppose further that conditional branch instruction I14 is changed to a "branch-if-not-equal" instruction, instructions I20-I23 are moved to memory locations directly following instruction I14, and instructions I15-I19 are moved to some memory locations remote from I14. With those changes, a relatively fast branch will occur from instruction I14 to instruction I15 at its new location remote from instruction I14; and, as before, a relatively fast branch will occur from instruction I16 to instruction I10.

But this rearrangement of the instructions is very wasteful of memory space for any situation where instructions I20-I23 form a subroutine that is used by many other parts of the program (not shown). In that case, it would be necessary to repeat the I20-I23 code each time it was used as described above in order to increase the execution speed. And such repetition of code for long or often used subroutines would use so much memory as to be impractical. Further, it would be impractical to rearrange pre-existing programs containing thousands and even millions of instructions in the above-described manner in order to increase execution time because such a task would be so immense and time-consuming.

BRIEF SUMMARY OF THE INVENTION

Accordingly, a primary object of the invention is to provide a digital computer which executes several instructions of a program simultaneously in a pipelined fashion in which the above-described wasted cycles are substantially minimized over the prior art.

This object, and others, are achieved according to the present invention by providing a memory means for storing a plurality of instructions arranged as a program; some of those instructions are conditional branch instructions; each conditional branch instruction tests a condition and branches to one instruction or another instruction based on the state of that condition; and each conditional branch instruction further has at least a first encoding predicting a first state of the condition to be tested, and has at least a second encoding predicting a second state of the condition to be tested.

BRIEF DESCRIPTION OF THE DRAWINGS

Various features and advantages of the invention are described in the Detailed Description with reference to the accompanying drawings wherein.

DETAILED DESCRIPTION OF THE INVENTION

One preferred embodiment of the invention will now be described in detail with reference to FIGS. 4A through 5B. In this embodiment, a plurality of instructions are arranged as a program; and a conditional branch instruction exists at several locations in that program. Each conditional branch instruction at those several locations tests a condition. But each conditional branch instruction has several possible encodings, and the encoding at each location predicts a state of the condition to be tested by the branch instruction at that location.

Figure 4A:
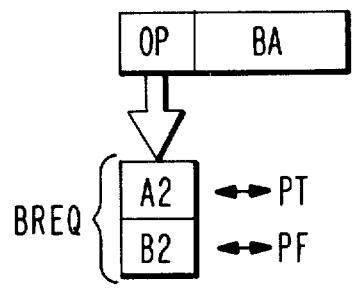
FIGS. 4A and 4B illustrate an encoding of two conditional branch instructions which greatly reduces wasted cycles in a pipelined digital computer constructed according to the invention.

Suppose, for example, that one condition being tested is the equals condition. Then suitable encoding of the branch on equal instruction according to this invention is illustrated in FIG. 4A. There the op code is given as either a hexadecimal A2 or B2. Both of these encodings specify that the equals condition is to be tested and a branch is taken to the instruction at address BA if the equals condition is true. But in addition, op code A2 predicts that the equals condition will be true when it is tested; whereas op code B2 predicts that the equals condition will be false when it is tested.

Figure 3:
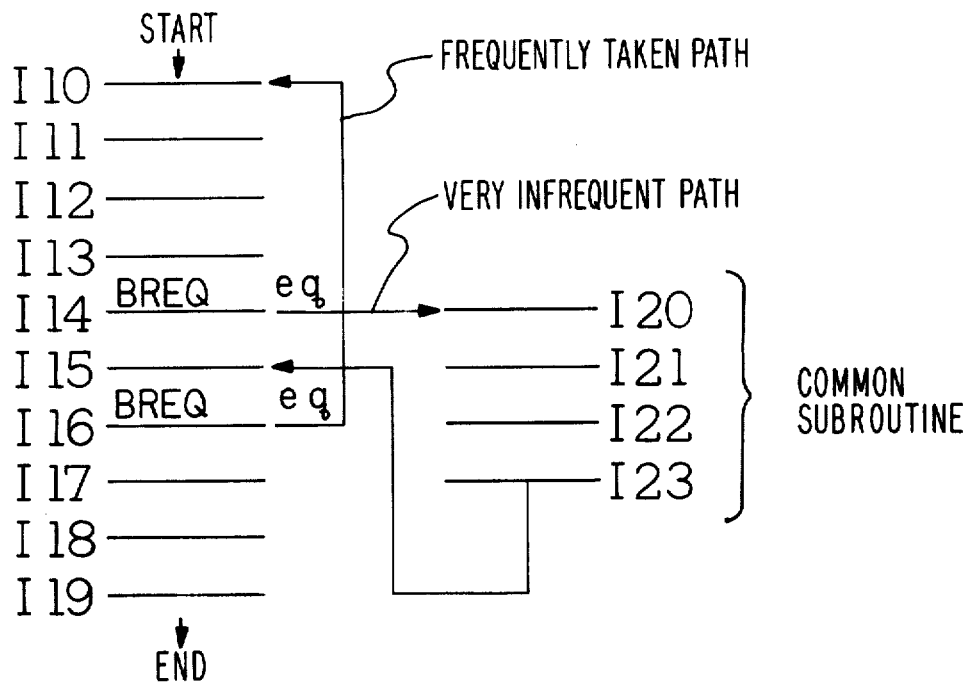
FIG. 3 illustrates a program having a pair of conditional branch instructions which cause wasted cycles in the pipelined digital computer of FIG. 1.

These op codes are selectively arranged in a program to be either A2 or B2 at each location where the branch or equal instruction occurs, depending upon whether the equals condition is most likely to be true or false when it is tested at that location. For example, referring back to FIG. 3, the equals condition tested by instruction I14 was stated to be almost always false; so the op code of instruction I14 would be encoded as B2. Conversely, the equals condition as tested by instruction I16 was stated to be almost always true; so the op code of instruction I16 would be encoded as A2.

Figure 2:
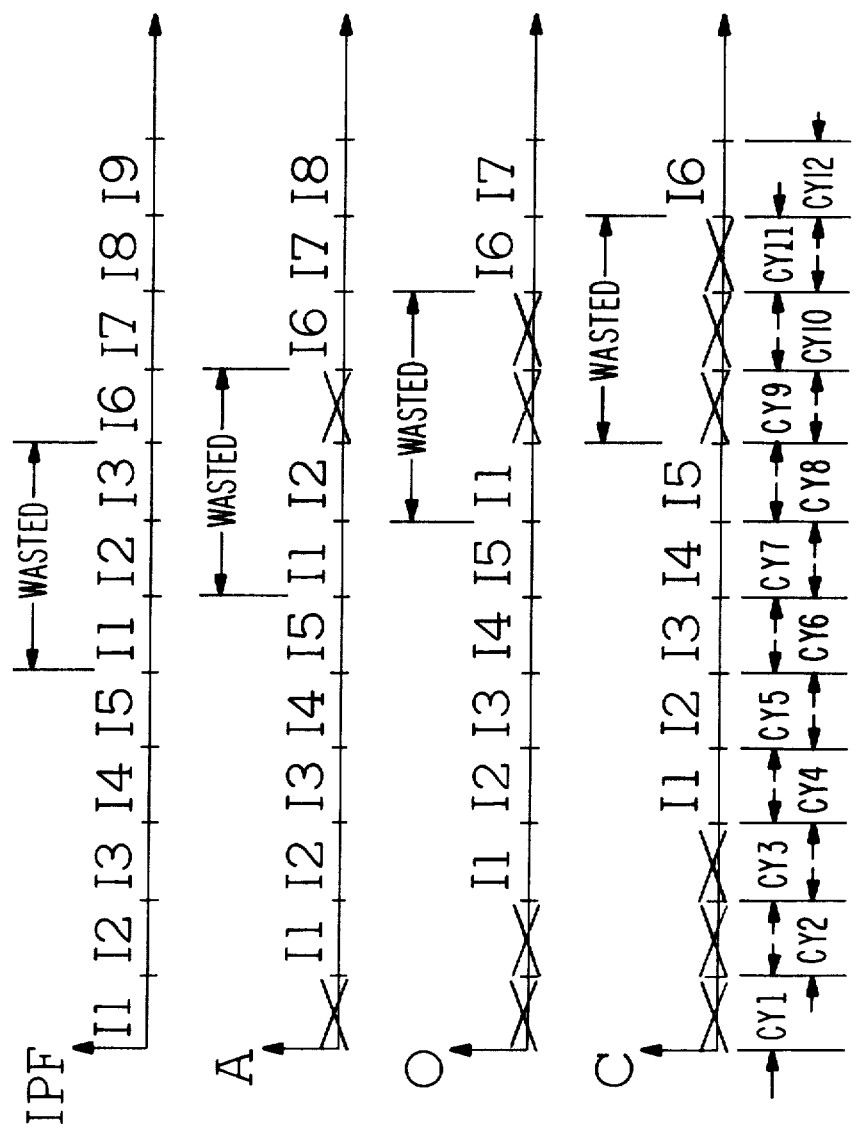
FIG. 2 illustrates the operation of the pipelined digital computer of FIG. 1.

Then according to this invention, when an instruction prefetch module fetches instructions I14 and I16, it detects the predicted conditions as encoded into those instructions and it fetches the next instruction based on those predictions. This in turn eliminates a great many of the wasted cycles that were discussed in reference to FIGS. 2 and 3 because in this invention, the predicted state of a condition is correlated to the location of the instruction which tests that condition, and not correlated simply to the condition itself.

Figure 4B:
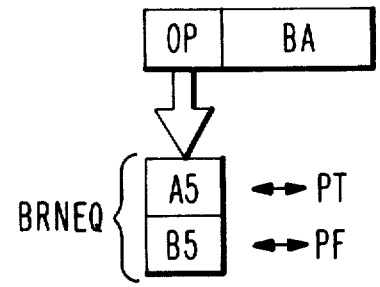

A similar encoding for the conditional branch instruction which tests the not equals condition is illustrated in FIG. 4B. There, hexadecimal op codes A5 and B5 both specify that the not equals condition should be tested and a branch should be taken to the instruction at location BA if the not equals condition is true. But in addition, encoding A5 predicts that the not equals condition will be true; and encoding B5 predicts that the not equals condition will be false. So if, for example, instruction I14 in the FIG. 3 program tested the not equals condition and the most likely state of that condition was true as tested at that location, then instruction I12 would have an encoding of A5.

Figure 5A:
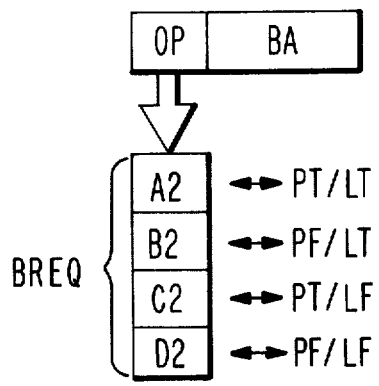
FIGS. 5A and 5B illustrate another encoding of two conditional branch instructions which also greatly reduces wasted cycles in a pipelined digital computer constructed according to the invention.
Figure 5B:
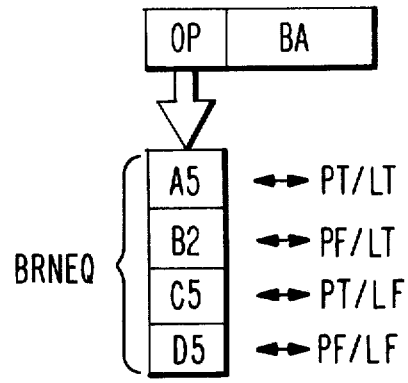

In accordance with other embodiments of the invention, conditional branch instructions are further encoded at their respective locations in a program to not only predict the state of the condition to be tested but to also give a history of the actual state of that condition as it was tested in the past. two examples of this encoding are illustrated in FIGS. 5A and 5B.

In FIG. 5A, the branch on equal instruction is specified by four op codes A2, B2, C2, or D2. Encodings A2 and C2 both predict that the equals condition will be true; and encodings B2 and D2 both predict that the equals condition will be false. But in addition, encodings A2 and B2 convey that the equals condition was true the last time it was tested by this instruction. Op codes C2 and D2 by comparison convey that the last time this instruction tested the equals condition it was false.

Similar encodings for the branch on not equal instruction are given in FIG. 5B. There, op codes A5, B5, C5, and D5 each specify a test and branch on the not equals condition. Op codes A5 and C5 predict a true state of the not equals condition and op codes B5 and D5 predict a false state of the not equals condition. Further, op codes A5 and B5 convey that the not equals condition was true the last time it was tested by this instruction; and op codes C5 and D5 convey that the not equals condition was false the last time it was tested by this instruction.

Figure 6:
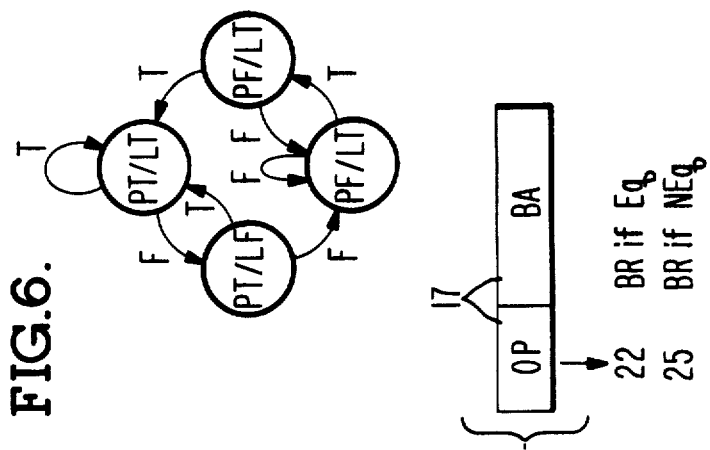
FIG. 6 is a state diagram illustrating a sequence by which the encodings of the instructions in FIGS. 5A and 5B are updated by a digital computer constructed according to the invention.

Since the instructions of FIGS. 5A and 5B encode the last state of a tested condition, that encoding must be updated with time as the instruction is executed. This updating occurs in the sequence indicated by the state diagram of FIG. 6. That figure includes four possible states designated as PT/LT, PT/LF, PF/LF, and PF/LT.

State PT/LT means that the instruction being considered predicts a true state for the condition to be tested and encountered a true condition the last time the instruction was executed. This corresponds to an encoding of A2 for a branch on equals instruction and an encoding of A5 for a branch on not equals instruction. Similarly, state PF/LF means that the branch instruction being considered predicts a false state for the condition to be tested and encountered a false condition the last time the instruction was executed.

Assume now that an instruction at a particular location in a program has an encoding corresponding to state PT/LT. Then when that instruction is executed, its encoding remains unchanged if the actual state of the tested condition is true. However, if the actual state of the tested condition is false, then the encoding of that instruction is changed to correspond to state PT/LF.

Suppose now that the instruction having state PT/LF encoded therein is executed. Then, if the tested condition is true, the encoding of that instruction is changed from PT/LF to PT/LT. But if the condition tested is false, the encoding of that instruction is changed from PT/LF to PF/LF.

In oher words, the predicted state of a condition is not changed until two wrong predictions have occurred in a row. This is desirable because a conditional branch instruction is commonly placed at the bottom of a program loop, such as instruction I16 in FIG. 3. Usually the branch is taken in one direction many times and in the other direction only once. But when the branch occurs in such other direction, the predicted condition should remain unchanged so that the next time the loop is entered a branch in the common one direction will again be predicted.

Figure 7:
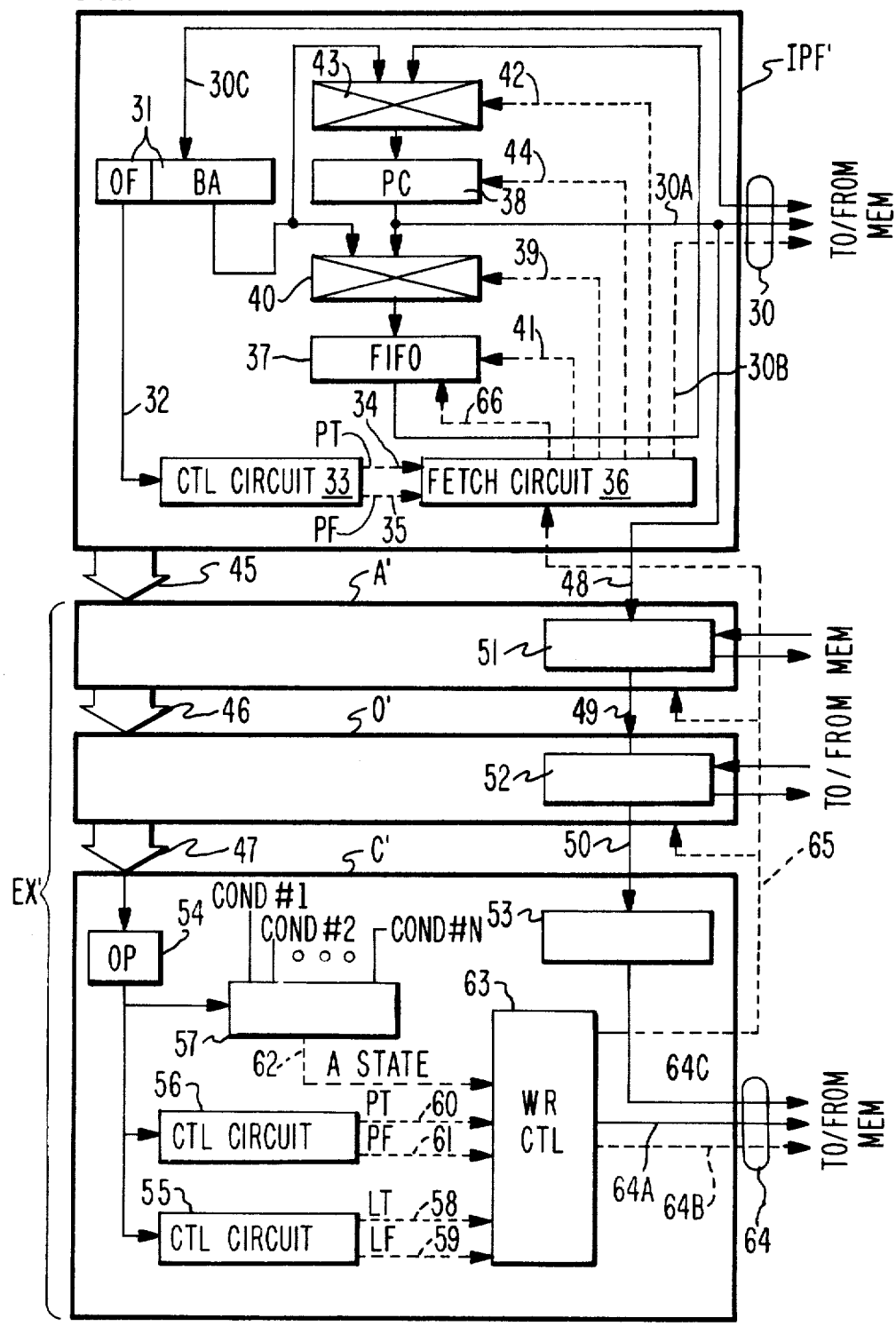
FIG. 7 illustrates the detailed circuitry of one preferred embodiment of a digital computer constructed according to the invention.

Reference is now made to FIG. 7 wherein one preferred embodiment of the hardware of a pipelined digital computer that executes the instructions of FIGS. 4A–6 is illustrated. That hardware includes an instruction prefetch stage IPF', an address stage A', an operand stage O', and a compute stage C'. These hardware stages perform all the functions that were previously performed by the prior art stages IPF, A, O, and C of FIG. 1; but they also include additional circuitry for operating on the conditional branch instructions of FIGS. 4A–6 in a manner that will now be described.

To begin, module IPF' fetches instructions from a program in a memory (not shown) over a memory bus 30. Conductors 30A provide a means for sending the address of the instruction to the memory, and conductors 30B provide a means for sending a read command to the memory.

Each fetched instruction is received from the memory on conductors 30C; and from there it is stored in register 31. That register has an op code portion which is sent via conductors 32 to a control circuit 33. In turn, circuit 33 detects when a conditional branch instruction is present in register 31 by decoding the previously described op codes of FIGS. 4A–5B.

If the instruction in register 31 is a conditional branch instruction which predicts a true state of the condition to be tested, then circuit 33 generates a control signal PT on a lead 34. Conversely, if a conditional branch instruction is present in register 31 which predicts a false state of the condition to be tested, then circuit 33 generates another control signal PF on a lead 35.

Signals PT and PF are sent to an instruction fetch circuit 36. In response to the signal PT, circuit 36 generates signals on conductors 39 and 41 which cause the address of the branch instruction in register 31 to be stored in a FIFO buffer 37. That address is held in a conventional fashion in a program counter 38; and so circuit 36 generates the signal conductor 39 to transfer the contents of program counter 38 through a multiplexer 40. The actual loading of the program counter contents from multiplexer 40 into FIFO 37 occurs then in response to the signal generated by circuit 36 on lead 41.

Thereafter, circuit 36 generates signals on conductors 42 and 44 which cause the branch address BA to transfer from register 31 to program counter 38. More specially, the signal on conductor 42 causes the branch address BA to pass through a multiplexer 43; and the signal on conductor 44 causes the BA address from multiplexer 43 to be loaded into the program counter. Then, the new contents of program counter 38 are sent over conductors 30A to fetch subsequent instructions.

Conversely, if signal PF is true, circuit 36 generates signals on conductors 39 and 41 which cause the branch address BA to be stored in FIFO 37. The signal on conductor 39 causes the branch address BA to pass through multiplexer 40, and the signal on conductor 41 causes the BA address from multiplexer 40 to be stored in FIFO 37. Subsequent instructions are thereafter fetched by incrementing the old contents of the program counter and using the result to address the memory via conductors 30A.

Figure 1:
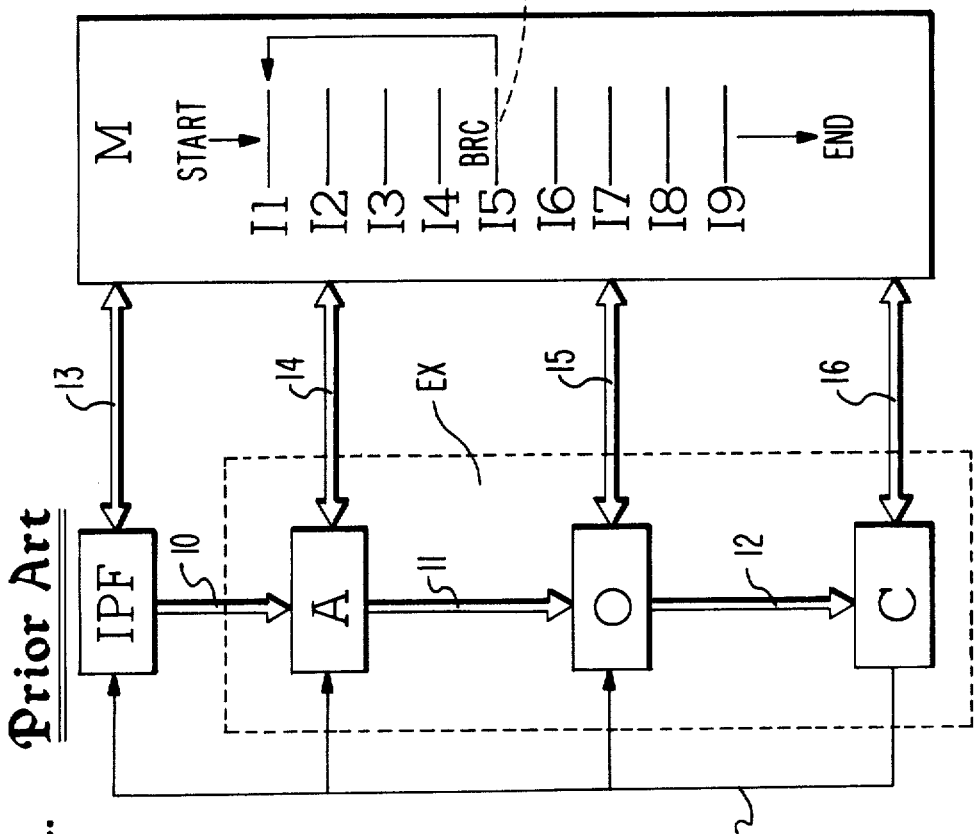
FIG. 1 illustrates the basic components of any pipelined digital computer of the prior art.

After each module completes its operations on a particular instruction, it passes its results to the next module as was previously described in conjunction with FIG. 1. To accomplish this, buses 45, 46, and 47 are provided between the various modules. But in addition, the FIG. 7 embodiment includes buses 48, 49, and 50 between the modules as a means for passing the address of the instruction in register 31 from one module to another along with the information that is conventionally passed on buses 45, 46, and 47.

A register 51 is provided in module A' to temporarily store the address that it receives on bus 48. Similarly, registers 52 and 53 are respectively provided in modules O' and C' to temporarily store the addresses that they receive from the preceding module. Module C' then utilizes the address in its register 53 in the following fashion.

Those results which are passed on bus 47 to module C' include the op code of the instruction on which module C' is to operate. That op code is stored in a register 54; and from there, the op code is sent to control circuits 55 and 56 and to a multiplexer 57. Circuit 55 generates a signal LT on a conductor 58 if the instruction in register 54 is a conditional branch instruction with an encoding that indicates the condition was true the last time the instruction was executed. Also, circuit 55 generates a signal LF on a conductor 59 if the instruction in register 54 is a conditional branch instruction with an encoding that indicates the tested condition was false the last time the instruction was executed.

Circuit 56 generates a signal PT on a conductor 60 if the instruction in register 54 is a conditional branch instruction which predicts the state of the tested condition to be true. And circuit 56 generates a signal PF on a conductor 61 if the instruction in register 54 is a conditional branch instruction which predicts the state of the tested condition to be false.

Multiplexer 57 receives all of the conditions that can be tested; and it responds to the op code in register 54 by gateing the one condition that is to be tested to a conductor 62. All of the signals on conductors 58–62 are then sent to a write control circuit 63 which operates to modify the encoding of the instruction at the address held in register 53 in the manner previously described in conjunction with FIG. 6.

Suppose, for example, that the signals on leads 58–61 indicate that a conditional branch instruction was in register 54 with an encoding corresponding to a PF/LT state. Suppose further that the signal on lead 62 indicates the present state of the tested condition is true. In that case, write control circuit 63 operates to generate an encoding on leads 64A corresponding to a PT/LT state, and to send a write command over conductor 64B. That information is sent over bus 64 to the memory where it is written in the memory at the location specified by the address on conductors 64C.

In the above example, the predicted state and the actual state of a condition to be tested were the same; and so no reset signal had to be sent to the preceding stages of the pipeline. But suppose that the signal on lead 62 indicates that the actual state of the condition to be tested is false. In that case, write control circuit 63 generates signals on lead 64A corresponding to a PF/LF state, sends a write command on conductor 64B, and generates a reset signal on a conductor 65.

Conductor 65 is coupled to circuit 36 in hardware stage IPF'; and in response to the reset signal on conductor 65, circuit 36 generates signals that cause the output of FIFO 37 to be transferred into program counter 38. Circuit 36 achieves this by generating a signal on conductor 42 which causes the output of FIFO 37 to pass through multiplexer 43, and by simultaneously generating a signal on conductor 44 which causes the output signals from multiplexer 43 to be loaded into program counter 38. Thereafter, circuit 36 sends a signal on a conductor 66 which causes FIFO 37 to perform a pop operation. The new contents of the program counter are then utilized to fetch instructions from the memory.

Various preferred embodiments of the invention have now been described in detail. In addition, however, many changes and modifications can be made to these details without departing from the nature and spirit of the invention. For example, it is to be understood that the number of stages in any pipelined digital computer constructed according to this invention is irrelevant. That is, the computer need only have an instruction prefetch stage which operates on one instruction and an execute stage which simultaneously operates on another instruction. And the execute stage may or may not be further partitioned into other stages such as modules A', O', and C'.

Also, it is to be understood that the detailed implementation of the various circuit components described in FIG. 7 is irrelevant. For example, fetch circuit 36 in module IPF' and write control circuit 63 in module C' may be implemented in any number of ways at the circuit designer's discretion. Either standard logic gates as sold by any semiconductor vendor or one custom integrated circuit on a single semiconductor chip may be used, for example.

Further, if only the predicted state of a condition to be tested but no history of that condition is encoded into the conditional branch instructions, then it is to be understood that some of the circuitry in FIG. 7 can be eliminated. For example, if the conditional branch instruction is encoded as per FIGS. 4A and 4B, then registers 51–53, control circuit 55, and that portion of write control circuit 63 which responds to control circuit 55 can be eliminated.

Further, it is to be understood that the predicted state of the condition to be tested and/or the last state of that condition can be encoded into a conditional branch instruction in a number of different ways. In particular, it is not necessary to encode that information into the op code of the instruction. Instead, that information can be encoded into any unused bit combinations of the branch address BA. For example, if the branch address is in binary coded decimal, then the unused hexadecimal combinations of that address can be utilized to encode the branch prediction and branch history information.

As still another alternative, it is to be understood that this invention may be incorporated into any digital device which executes a program containing just a single conditional branch instruction. Suppose, for example, that the single conditional branch instruction is in a program loop which continually updates the content of a register and then tests that register content. Suppose further that the updated information going into the register is such that the test condition is always false for the first hundred times through the loop, then the test condition is always true for the next hundred times through the loop, etc. Clearly, the embodiment of this invention described in conjunction with FIG. 6 would significantly improve the digital device's execution of that program loop.

Accordingly, since many changes and modifications can be made to the above-described details without departing from the nature and spirit of the invention, it is to be understood that the invention is not limited to said details but is defined by the appended claims.

What is claimed is:

1. An improved digital device including a memory means for storing a plurality of instructions arranged as a program with conditional branch instructions at respective locations in said program specifying conditions to be tested; an instruction prefetch means and an instruction execute means for respectively fetching and executing different instructions of said program at the same time in a pipelined fashion; said conditional branch instruction at each of said locations further having multiple encodings which predict the state of the condition to be tested; and a control means for detecting when said prefetch means has fetched one of said conditional branch instructions and for fetching the next instruction based on the predicted state of the condition to be tested and encoded in said fetched conditional branch instruction.

2. A device according to claim 1 and further including a writing means for changing said encoding of said fetched conditional branch instruction at its memory location in a predetermined fashion in response to that instruction having an encoding which predicts a state of said condition that is different than the actual state of said condition at the time when that instruction is executed in said pipeline by said execute means.

3. A device according to claim 1 and further including means for detecting other encodings of said fetched conditional branch instruction which give a history of how said predicted state of said condition compared with the actual state of said condition during previous executions of the fetched conditional branch instruction.

4. A device according to claim 3 and further including a writing means for changing the encoding of said fetched conditional branch instruction in a predetermined fashion at its memory location in response to said means for detecting having detected that the predicted state of said condition was different than the actual state of said another condition the last time said fetched conditional branch instruction was executed by said execute means.

5. A device according to claim 1 wherein said conditional branch instruction has an operation code, and said multiple encodings are encodings of said operation code.

6. A device according to claim 5 wherein said encodings of said operation code of said conditional branch instruction are binary encodings.

7. A device according to claim 1 wherein said device is a digital computer.

8. A programmable digital device including a memory means for storing a plurality of instructions arranged as a program; a conditional branch instruction at one location in said program having a first encoding specifying a condition to be tested and predicting a first state of said condition; another conditional branch instruction at another location in said program having a second encoding specifying said same condition to be tested and predicting a second state of said condition; and a means for fetching said conditional branch instruction from any one of said locations and for thereafter fetching the next instruction from said program based on said predicted state of said condition as encoded in said fetched conditional branch instruction.

9. A programmed digital device including a memory means for storing a plurality of instructions arranged as a program; at least one of said instructions being a conditional branch instruction specifying a condition to be tested; said at least one conditional branch instruction having at least a first encoding predicting a first state of said condition and having at least a second encoding predicting a second state of condition.

* * * * *